US009086842B2

(12) United States Patent
Wen et al.

(10) Patent No.: US 9,086,842 B2
(45) Date of Patent: Jul. 21, 2015

(54) ELECTRONIC DEVICE WITH A PIVOTING MECHANISM CAPABLE OF PROVIDING DIFFERENT TORQUES

(71) Applicant: Wistron Corporation, New Taipei (TW)

(72) Inventors: Yi-Hsin Wen, New Taipei (TW); Ming-Shan Li, New Taipei (TW); Min-Wei Lin, New Taipei (TW)

(73) Assignee: Wistron Corporation, Haichih, New Taipei (TW)

( * ) Notice: Subject to any disclaimer, the term of this patent is extended or adjusted under 35 U.S.C. 154(b) by 81 days.

(21) Appl. No.: 14/153,064

(22) Filed: Jan. 12, 2014

(65) Prior Publication Data

US 2014/0307379 A1    Oct. 16, 2014

(30) Foreign Application Priority Data

Apr. 11, 2013    (TW) .............................. 102112930 A

(51) Int. Cl.
*G06F 1/16* (2006.01)
*G06F 1/18* (2006.01)

(52) U.S. Cl.
CPC .............. *G06F 1/1601* (2013.01); *G06F 1/166* (2013.01); *G06F 1/181* (2013.01)

(58) Field of Classification Search
CPC ................................................... G06F 1/1601
See application file for complete search history.

(56) References Cited

U.S. PATENT DOCUMENTS

| 5,947,429 | A | * | 9/1999 | Sweere et al. | ........... 248/123.11 |
|---|---|---|---|---|---|
| 5,992,809 | A | * | 11/1999 | Sweere et al. | ............. 248/278.1 |
| 6,015,120 | A | * | 1/2000 | Sweere et al. | ........... 248/123.11 |
| 6,019,332 | A | * | 2/2000 | Sweere et al. | ............. 248/284.1 |
| 6,134,103 | A | * | 10/2000 | Ghanma | ................... 361/679.05 |
| 6,288,891 | B1 | * | 9/2001 | Hasegawa et al. | ....... 361/679.07 |
| 6,889,404 | B2 | * | 5/2005 | Lu et al. | ........................... 16/287 |
| 7,124,984 | B2 | * | 10/2006 | Yokouchi et al. | ........... 248/125.8 |
| 7,289,315 | B2 | * | 10/2007 | Hillman et al. | ........... 361/679.55 |
| 7,472,459 | B2 | * | 1/2009 | Lee et al. | ........................ 16/342 |
| 8,498,101 | B2 | * | 7/2013 | Chiang et al. | ............. 361/679.22 |
| 8,693,172 | B2 | * | 4/2014 | Russell et al. | ............ 361/679.01 |
| 8,944,396 | B2 | * | 2/2015 | Mau et al. | ................... 248/284.1 |
| 8,967,569 | B2 | * | 3/2015 | Hsu | .............. 248/284.1 |
| 2006/0187625 | A1 | * | 8/2006 | Jung et al. | ..................... 361/681 |

(Continued)

FOREIGN PATENT DOCUMENTS

TW    M436174    8/2012

*Primary Examiner* — Lisa Lea Edmonds

(74) *Attorney, Agent, or Firm* — Winston Hsu; Scott Margo

(57) ABSTRACT

An electronic device includes a display module, a supporting frame and a pivoting mechanism connected to the display module and the supporting frame. The display module can pivot relative to the supporting frame. The pivoting mechanism includes two fixing components connected to the display module, two shaft components passing through the supporting frame, two locating components respectively disposed on an inner side of the supporting frame, two resilient components, two pulling components and two cam components. An end of each resilient component is connected to the corresponding locating component. An end of each pulling component is connected to the other end of the corresponding resilient component. A side of each cam component is connected to the corresponding fixing component, and the other side of each cam component is connected to the corresponding shaft component. The other end of the pulling component winds around the corresponding cam component.

10 Claims, 6 Drawing Sheets

(56) References Cited

U.S. PATENT DOCUMENTS

| | | | |
|---|---|---|---|
| 2006/0238966 A1* | 10/2006 | Sung | 361/681 |
| 2013/0021723 A1* | 1/2013 | Harper et al. | 361/679.01 |
| 2013/0271901 A1* | 10/2013 | Lin | 361/679.01 |
| 2014/0063750 A1* | 3/2014 | Mau et al. | 361/728 |

* cited by examiner

ELECTRONIC DEVICE WITH A PIVOTING MECHANISM CAPABLE OF PROVIDING DIFFERENT TORQUES

BACKGROUND OF THE INVENTION

1. Field of the Invention

The present invention relates to an electronic device, and more specifically, to an electronic device with a pivoting mechanism capable of providing different torques.

2. Description of the Prior Art

In the modern society, an All-In-One PC becomes one of the most popular consumer electronic devices. The All-In-One PC often includes a touch display module, a pivoting mechanism and a supporting frame. The pivoting mechanism is connected to the supporting frame and the touch display module, so that the touch display module can pivot relative to the supporting frame. A user can push the touch display module to pivot relative to the supporting frame to adjust a view angle of the touch display module to meet the user's requirement. However, in a procedure of pivoting the touch display module relative to the supporting frame, because the torque provided by a torsion spring of the pivoting mechanism cannot be adjusted continuously according to a torque generated by the gravity of the touch display module, an unsmooth feeling of the user occurs in the procedure of pushing the display module. Therefore, it is an important issue to design a pivoting mechanism capable of facilitating the user to push the touch display module to pivot relative to the supporting frame smoothly.

SUMMARY OF THE INVENTION

The present invention is to provide an electronic device with a pivoting mechanism capable of providing different torques to solve above problems.

According to the disclosure, an electronic device with a pivoting mechanism capable of providing different torques includes a display module, a supporting frame and a pivoting mechanism. The supporting frame includes a base portion and two supporting portions. The pivoting mechanism is connected to the display module and the supporting frame, for pivoting the display module relative to the supporting frame. The pivoting mechanism includes two fixing components, two shaft components, two locating components, two resilient components, two pulling components and two cam components. The two fixing components are connected to the display module. Each shaft component passes through the corresponding supporting portion of the supporting frame. The two locating components are respectively disposed on inner sides of the two supporting portions. An end of each resilient component is connected to the corresponding locating component. An end of each pulling component is connected to the other end of the corresponding resilient component, and each pulling component is for pulling the corresponding resilient component, so that the resilient component provides a resilient force. A side of each cam component is connected to the corresponding fixing component, the other side of each cam component is connected to the corresponding shaft component, the other end of the pulling component winds around the corresponding cam component, and each cam component is driven to rotate as the display module pivots relative to the supporting frame, so as to drive the corresponding pulling component to wind around the cam component so as to pull the corresponding resilient component.

According to the disclosure, the display module is a touch display module.

According to the disclosure, the each resilient component is a tension spring, and the each pulling component is made of rigid material.

According to the disclosure, a fixing slot is formed on each cam component for containing and fixing the other end of the corresponding pulling component.

According to the disclosure, the cam component is formed in a non-circular shape.

According to the disclosure, the electronic device further includes two adjusting components respectively disposed on the inner sides of the two supporting portions and connected to the two locating components, and each adjusting component is for adjusting a relative position of the corresponding locating component and the corresponding supporting portion.

According to the disclosure, the adjusting component is for adjusting the relative position of the corresponding locating component and the corresponding supporting portion according to a weight of the display module, and the adjusting component comprises a screw and a nut.

According to the disclosure, the nut is rotated to drive the corresponding locating component to move relative to the corresponding screw and far away from the corresponding fixing component as the display module is heavy.

According to the disclosure, the nut is rotated to drive the corresponding locating component to move relative to the corresponding screw and close to the corresponding fixing component as the display module is light.

According to the disclosure, the electronic device further includes a slip-resistant component disposed under the base portion.

The cam component with the non-circular shape of the present invention is used for pulling the corresponding pulling component to drive the corresponding resilient component. Therefore, as the display module pivots to different angles relative to the supporting frame, the pulling components is driven by the corresponding cam components with different movement, so as to wind around different surfaces with different curvatures of the corresponding cam component, so that the corresponding resilient component is also driven with different movement to deform in a variable increasing rate. As a result, the corresponding resilient component can generate the resilient force with a nonlinear variation relative to pivotal movement between the display module and the supporting frame, so as to correspond to the nonlinear torque generated by the gravity of the display module. As a result, in the procedure of pivoting the display module relative to supporting frame, the torque output from the pivoting mechanism and the torque generated by the gravity of the display module can be identical, and the user can push the display module with a fixed force to pivot relative to the supporting frame, so as to improve the conventional problem of the unsmooth feeling of the user in the procedure of pushing the display module because the torque provided by the torsion spring of the conventional pivoting mechanism cannot be adjusted continuously according to the torque generated by the gravity of the display module in the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
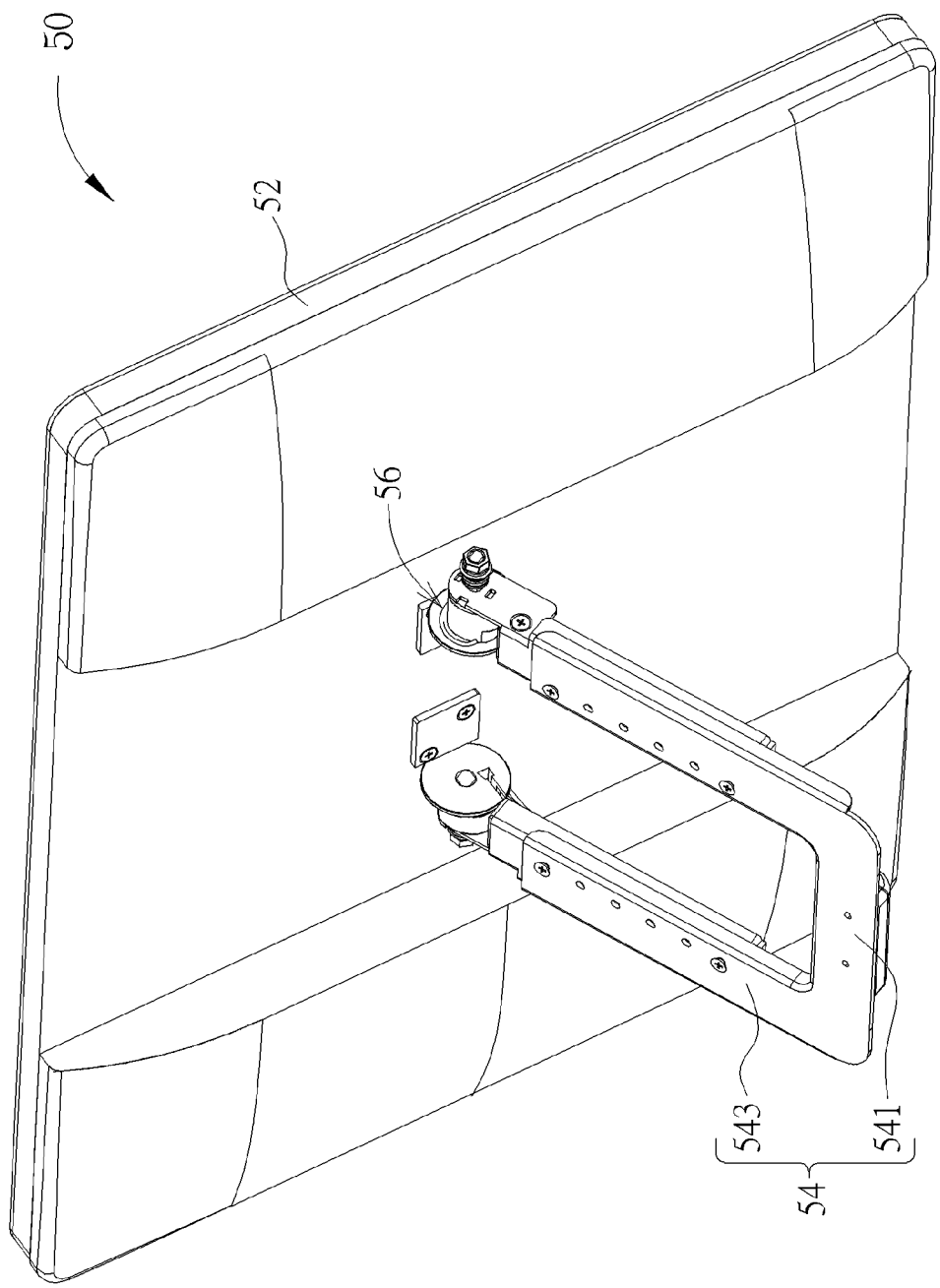
FIG. 1 is a diagram of an electronic device according to an embodiment of the present invention.

Please refer to the FIG. 1. FIG. 1 is a diagram of an electronic device 50 according to an embodiment of the present invention. The electronic device 50 of the present invention includes a display module 52, a supporting frame 54 and a pivoting mechanism 56. The display module 52 can be an All-In-One PC including various electronic components, such as a display module, a CPU, a hard drive, a fan, a memory, and so on. A user can directly touch the display module to input various commands. The supporting frame 54 includes a base portion 541 and two supporting portions 543. The pivoting mechanism 56 is connected to the display module 52 and the supporting frame 54 for pivoting the display module 52 relative to the supporting frame 54. In this embodiment, the pivoting mechanism 56 is disposed inside the supporting frame 54, so that the pivoting mechanism 56 of the present invention occupies less mechanical space than the conventional All-In-One PC. In a normal operation, the user can adjust an angle between the display module 52 and the supporting frame 54 freely, so as to require the most comfortable angle for operating. For example, the user can pivot the display module 52 relative to the supporting frame 54 to an angle illustrated in FIG. 1 and dispose the electronic device 50 on a desktop, so as to facilitate the user to perform a touch operation. In this embodiment, the angle between the display module 52 and the supporting frame 54 can be within a range from 0 degree to 180 degrees. That is, the display module 52 can lie on the desktop flatly.

Figure 2:
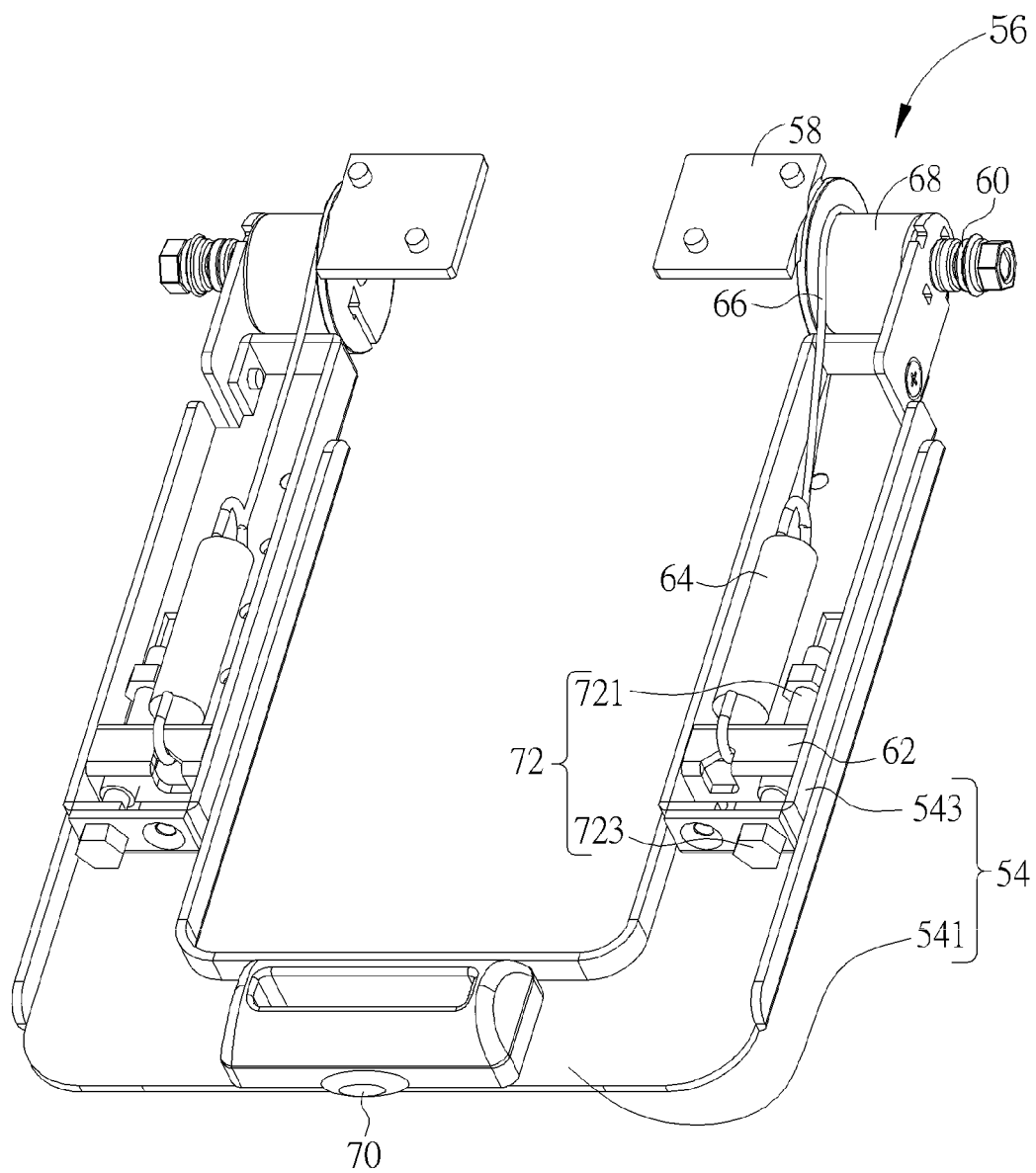
FIG. 2 is a structural diagram of a supporting frame and a pivoting mechanism according to the embodiment of the present invention.

Please refer to FIG. 2. FIG. 2 is a structural diagram of the supporting frame 54 and the pivoting mechanism 56 according to the embodiment of the present invention. The pivoting mechanism 56 includes two fixing components 58, two shaft components 60, two locating components 62, two resilient components 64, two pulling components 66 and two cam components 68. The two fixing components 58 are connected to the display module 52, and each shaft component 60 passes through the corresponding supporting portion 543 of the supporting frame 54. The two locating components 62 are respectively disposed on inner sides of the two supporting portions 543 and respectively fixed on the two supporting portions 543. An end of each resilient component 64 is connected to the corresponding locating component 62. In this embodiment, each resilient component 64 can be a tension spring. An end of each pulling component 66 is connected to the other end of the corresponding resilient component 64, and each pulling component 66 is for pulling the corresponding resilient component 64, so that the resilient component 64 provides a resilient force. In this embodiment, each pulling component 66 can be made of rigid material. For example, each pulling component 66 can be a steel wire. That is, each pulling component 66 can be regarded as a rigid body and does not deform as being forced.

Figure 3:
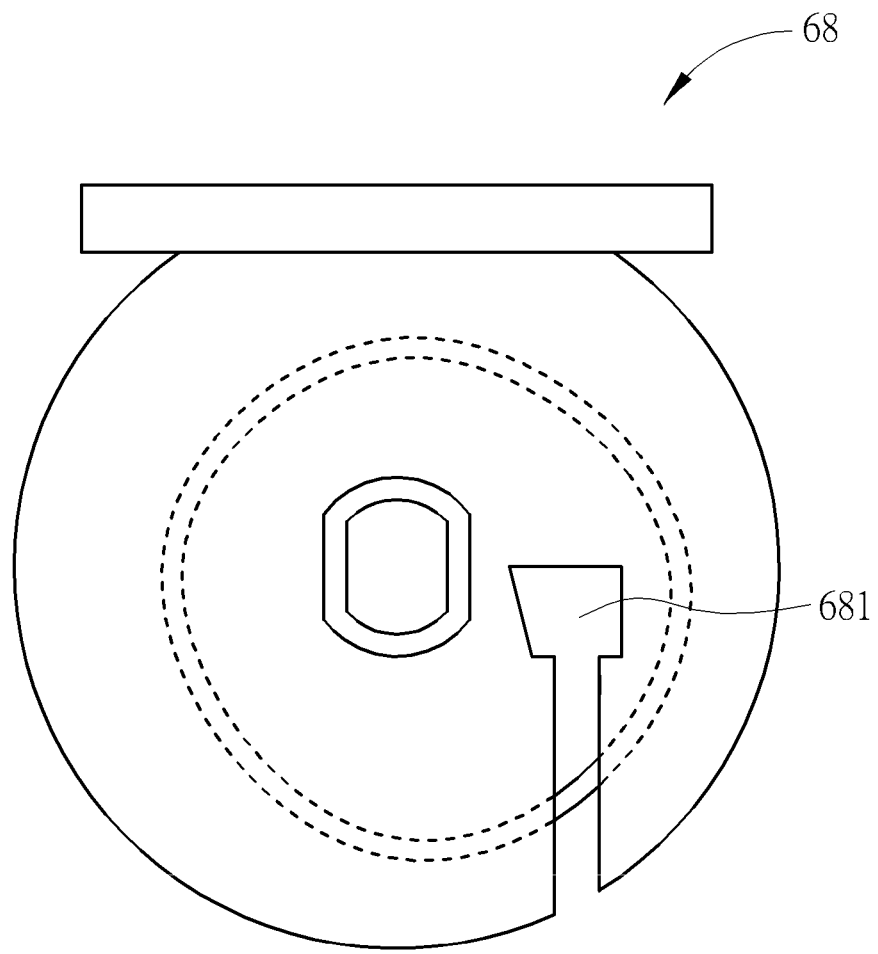
FIG. 3 is a diagram of a cam component according to the embodiment of the present invention.

Please refer to FIG. 2 and FIG. 3. FIG. 3 is a diagram of the cam component 68 according to the embodiment of the present invention. Each cam component 68 is formed in a non-circular shape, and a side of each cam component 68 is connected to the corresponding fixing component 58. In this embodiment, each cam component 68 and the corresponding fixing component 58 can be integrally formed. The other side of each cam component 68 is connected to the corresponding shaft component 60. That is, each cam component 68 can rotate with the corresponding shaft component 60 simultaneously. In addition, a fixing slot 681 is formed on each cam component 68 for containing and fixing the other end of the corresponding pulling component 66. After the other end of the each pulling component 66 is fixed inside the corresponding fixing slot 681, the other end of the pulling component 66 can wind around the corresponding cam component 68, and the end of the pulling component 66 is connected to the corresponding resilient component 64. Each cam component 68 is connected to the corresponding fixing component 58, and the fixing component 58 is connected to the display module 52, so that each cam component 68 is driven to rotate as the display module 52 pivots relative to the supporting frame 54, so as to drive the corresponding pulling component 66 to wind around the cam component 68 so as to pull the corresponding resilient component 64.

Figure 4:
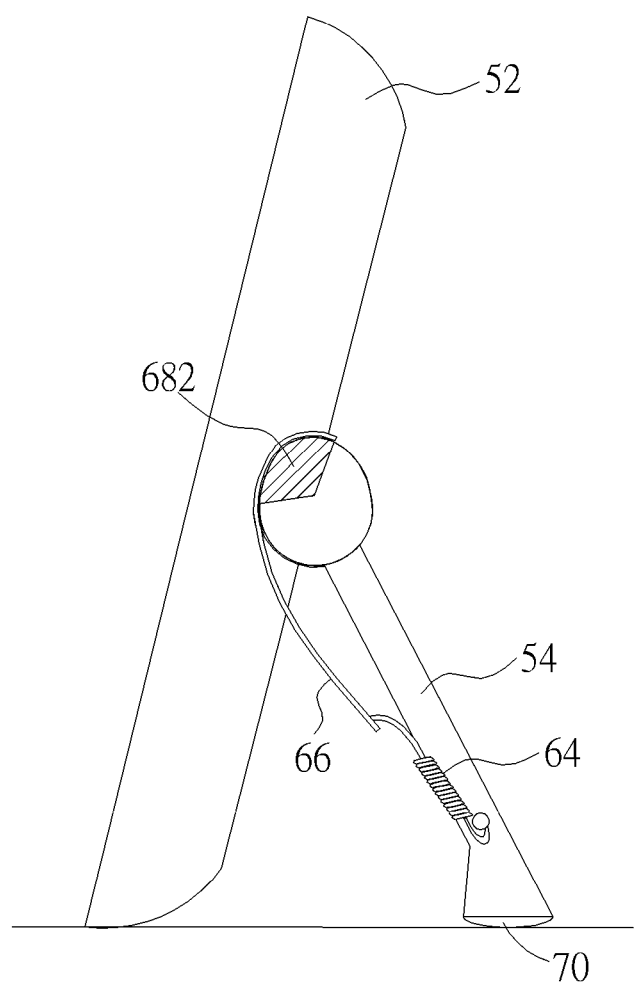
FIG. 4 to FIG. 6 are diagrams illustrating that a display module pivots to different angles relative to the supporting frame according to the embodiment of the present invention.
Figure 5:
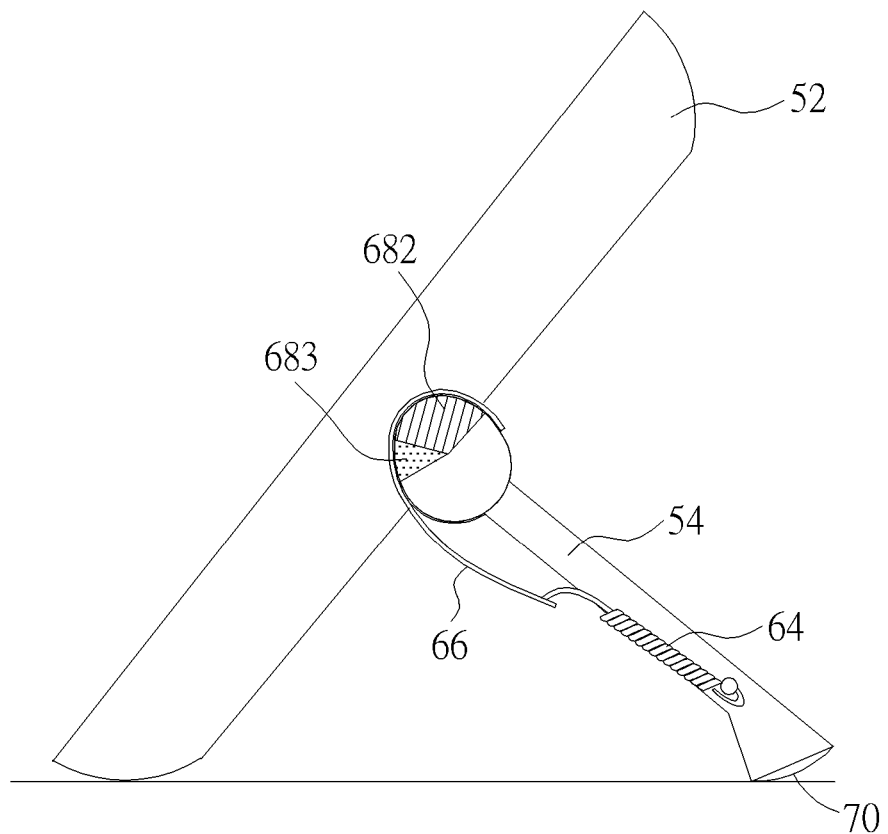
Figure 6:
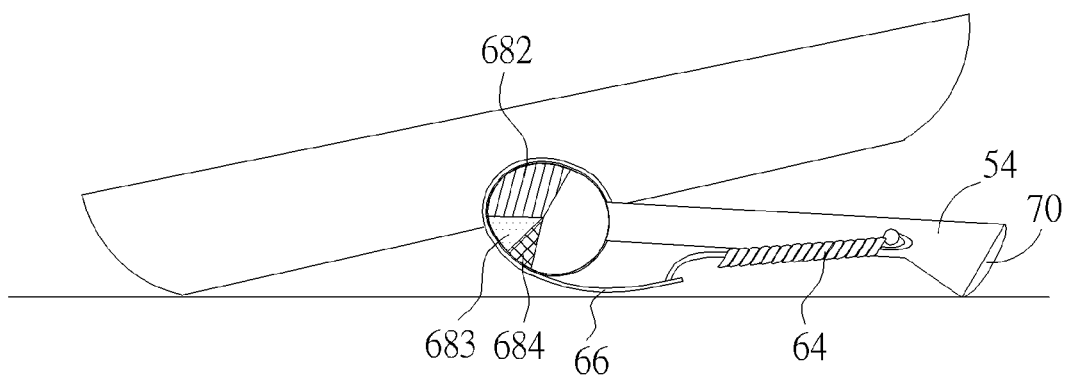

Please refer to FIG. 4 to FIG. 6. FIG. 4 to FIG. 6 are diagrams illustrating that the display module 52 pivots to different angles relative to the supporting frame 54 according to the embodiment of the present invention. In a procedure of pivoting the display module 52 relative to the supporting frame 54, a relation between a torque generated by the gravity of the display module 52 and an angle between the display module 52 and a supporting surface for supporting the electronic device 50 is a nonlinear function, such as a cosine function, so that the torque generated by the gravity of the display module 52 increases rapidly and then decreases gradually in the procedure of pivoting the display module 52 relative to the supporting frame 54. The resilient component 64 provides the linear resilient force. In order to balance the resilient force of the resilient component 64, the torque generated by the shaft component 60 and the gravity of the display module 52, the cam component 68 with the non-circular shape of the present invention is used for pulling the corresponding pulling component 66 to drive the corresponding resilient component 64. That is, as the display module 52 pivots to different angles relative to the supporting frame 54, the pulling components 66 is driven by the corresponding cam components 68 with different movement, so as to wind around different surfaces with different curvatures of the corresponding cam component 68, so that the corresponding resilient component 64 is also driven with different movement to deform in a variable increasing rate. As a result, the corresponding resilient component 64 can generate a resilient force with a nonlinear variation relative to pivotal movement between the display module 52 and the supporting frame 54, so as to correspond to the torque generated by the gravity of the display module 52 with a nonlinear variation, so that the user can push the display module 52 with a fixed force to pivot relative to the supporting frame 54, so as to avoid an unsmooth feeling of the user in a procedure of pushing the display module 52.

For example, in a procedure of pivoting the display module 52 relative to the supporting frame 54, an initial increasing rate of the torque generated by the gravity of the display module 52 is close to a constant. At this time, the movement of the pulling component 66 to wind around the cam component 68, which is driven by rotation of the cam component 68, corresponds to a first portion 682 of the cam component 68 illustrated in FIG. 4. Then, as the display module 52 pivots relative to the supporting frame 54 from a state shown in FIG. 4 to a state shown in FIG. 5, the increase of the torque generated by the gravity of the display module 52 gradually slow down. Therefore, in order to conform the torque generated by the resilient force of the resilient component 64 to the torque generated by the gravity of the display module 52, a second portion 683 which is wound by the pulling component 66 can be designed to be smaller than the first portion 682. That is, a curvature of the second portion 683 can be designed to be smaller than a curvature of the first portion 682. As a result, the following movement of the pulling component 66 on the cam component 68 decreases gradually, so that an increasing rate of deformation of the resilient component 64 decreases, so as to generate the torque with the smaller increasing rate. Finally, as the display module 52 pivots relative to the supporting frame 54 from the state shown in FIG. 5 to a state shown in FIG. 6, the increase of the torque generated by the gravity of the display module 52 slow down more, so that a third portion 684 which is wound by the pulling component 66 later can be designed to be smaller than the second portion 683. That is, a curvature of the third portion 684 can be designed to be smaller than the curvature of the second portion 683. That is, the following movement of the pulling component 66 on the cam component 68 becomes smaller, so that the increasing rate of deformation of the resilient component 64 decreases more, so as to generate the torque with the smaller increasing rate.

Please refer to FIG. 1 to FIG. 6. The electronic device 50 of the present invention further includes a slip-resistant component 70 disposed under the base portion 541. The slip-resistant component 70 is for increasing the friction between the supporting frame 54 and the desktop. As the user push the display module 52 to pivot relative to the supporting frame 54, the angle between the supporting frame 54 and the supporting surface becomes smaller gradually, and the display module 52 is close to the user, so as to facilitate the user to perform the touch operation. At this time, the slip-resistant component 70 can prevent the supporting frame 54 from slipping relative to the supporting surface. It is noticed that the electronic device 50 of the present invention further includes two adjusting components 72 respectively disposed on the inner sides of the two supporting portions 543 and connected to the two locating components 62. Each adjusting component 72 is for adjusting a relative position of the corresponding locating component 62 and the corresponding supporting portion 543, so as to adjust the resilient force provided by the resilient component 64. That is, the two adjusting components 72 can be for adjusting the relative position of the corresponding locating component 62 and the corresponding supporting portion 543 according to the weight of the display module 52. For example, each adjusting component 72 can includes a screw 721 and a nut 723. The nut 723 can be rotated to drive the corresponding locating component 62 to move relative to the corresponding screw 721 as the display module 52 is heavy. At this time, the locating component 62 moves relative to the supporting frame 54 and far away from the corresponding fixing component 58, so as to pull the corresponding resilient component 64, so that the resilient component 64 can generate greater deformation to provide the larger resilient force to resist the larger torque generated by the gravity of the heavy display module 52. Moreover, the nut 723 can be rotated to drive the corresponding locating component 62 to move relative to the corresponding screw 721 as the display module 52 is light. At this time, the locating component 62 moves relative to the supporting frame 54 and close to the corresponding fixing component 58, so as to decrease the movement of pulling the corresponding resilient component 64, so that the resilient component 64 can generate smaller deformation to provide the smaller resilient force to resist the smaller torque generated by the gravity of the light display module 52.

In contrast the prior art, the cam component with the non-circular shape of the present invention is used for pulling the corresponding pulling component to drive the corresponding resilient component. Therefore, as the display module pivots to different angles relative to the supporting frame, the pulling components is driven by the corresponding cam components with different movement, so as to wind around different surfaces with different curvatures of the corresponding cam component, so that the corresponding resilient component is also driven with different movement to deform in a variable increasing rate. As a result, the corresponding resilient component can generate the resilient force with a nonlinear variation relative to pivotal movement between the display module and the supporting frame, so as to correspond to the nonlinear torque generated by the gravity of the display module. As a result, in the procedure of pivoting the display module relative to supporting frame, the torque output from the pivoting mechanism and the torque generated by the gravity of the display module can be identical, and the user can push the display module with a fixed force to pivot relative to the supporting frame, so as to improve the conventional problem of the unsmooth feeling of the user in the procedure of pushing the display module because the torque provided by the torsion spring of the conventional pivoting mechanism cannot be adjusted continuously according to the torque generated by the gravity of the display module in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device with a pivoting mechanism capable of providing different torques, the electronic device comprising:
    a display module;
    a supporting frame comprising a base portion and two supporting portions; and
    a pivoting mechanism connected to the display module and the supporting frame, for pivoting the display module relative to the supporting frame, the pivoting mechanism comprising:
        two fixing components connected to the display module;
        two shaft components, each shaft component passing through the corresponding supporting portion of the supporting frame;
        two locating components respectively disposed on inner sides of the two supporting portions;
        two resilient components, an end of each resilient component being connected to the corresponding locating component;
        two pulling components, an end of each pulling component being connected to the other end of the corresponding resilient component, and each pulling component being for pulling the corresponding resilient component, so that the resilient component provides a resilient force; and
        two cam components, a side of each cam component being connected to the corresponding fixing component, the other side of each cam component being connected to the corresponding shaft component, the other end of the pulling component winding around the corresponding cam component, and each cam component being driven to rotate as the display module pivots relative to the supporting frame, so as to drive the corresponding pulling component to wind around the cam component so as to pull the corresponding resilient component.

2. The electronic device of claim 1, wherein the display module is a touch display module.

3. The electronic device of claim 1, wherein the each resilient component is a tension spring, and the each pulling component is made of rigid material.

4. The electronic device of claim 1, wherein a fixing slot is formed on each cam component for containing and fixing the other end of the corresponding pulling component.

5. The electronic device of claim 4, wherein the cam component is formed in a non-circular shape.

6. The electronic device of claim 1, further comprising two adjusting components respectively disposed on the inner sides of the two supporting portions and connected to the two locating components, and each adjusting component being for adjusting a relative position of the corresponding locating component and the corresponding supporting portion.

7. The electronic device of claim 6, wherein the adjusting component is for adjusting the relative position of the corresponding locating component and the corresponding supporting portion according to a weight of the display module, and the adjusting component comprises a screw and a nut.

8. The electronic device of claim 7, wherein the nut is rotated to drive the corresponding locating component to move relative to the corresponding screw and far away from the corresponding fixing component as the display module is heavy.

9. The electronic device of claim 7, wherein the nut is rotated to drive the corresponding locating component to move relative to the corresponding screw and close to the corresponding fixing component as the display module is light.

10. The electronic device of claim 1, further comprising a slip-resistant component disposed under the base portion.

* * * * *

UNITED STATES PATENT AND TRADEMARK OFFICE
CERTIFICATE OF CORRECTION

PATENT NO. : 9,086,842 B2  Page 1 of 1
APPLICATION NO. : 14/153064
DATED : July 21, 2015
INVENTOR(S) : Yi-Hsin Wen et al.

It is certified that error appears in the above-identified patent and that said Letters Patent is hereby corrected as shown below:

On the title page, item (73), correct the residence of the assignee from "Haichih, New Taipei (TW)" to --Hsichih, New Taipei (TW)--.

Signed and Sealed this
Thirty-first Day of May, 2016

Michelle K. Lee
*Director of the United States Patent and Trademark Office*